July 7, 1936.     E. N. JACOBI     2,046,514
SPRING CLIP
Filed Jan. 10, 1935
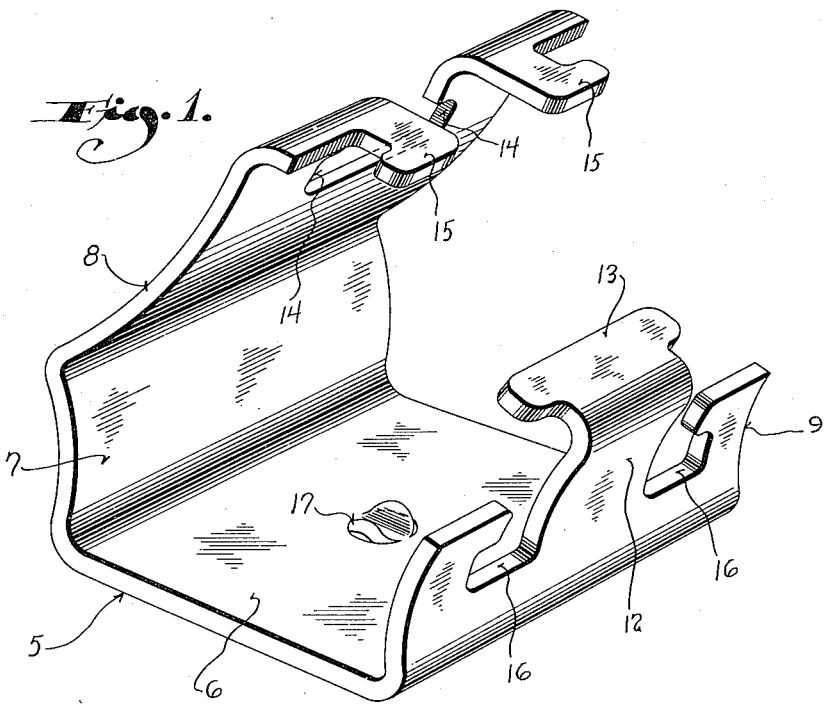
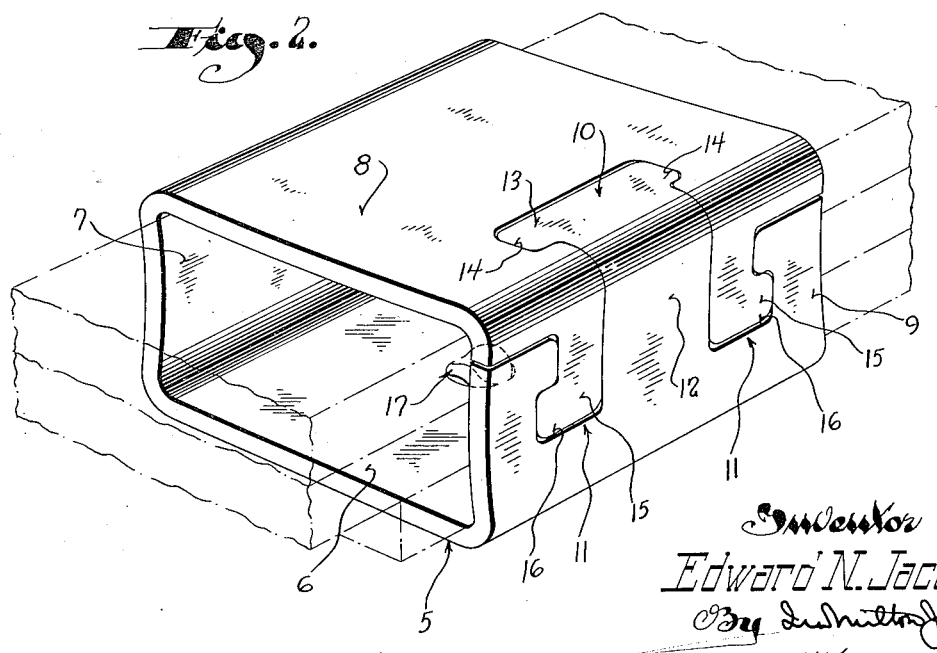
Inventor
Edward N. Jacobi
By
Attorney Patented July 7, 1936

2,046,514

UNITED STATES PATENT OFFICE 2,046,514

SPRING CLIP

Edward N. Jacobi, Milwaukee, Wis., assignor to Briggs & Stratton Corporation, Milwaukee, Wis., a corporation of Delaware Application January 10, 1935, Serial No. 1,134

11 Claims. (Cl. 267—53)

This invention relates to improvements in spring clips, and has as a general object to provide a clip which will not cause objectionable bulging of the spring cover. This object is attained by making the clip in the form of a thin metal band.

Another object of this invention is to provide an improved manner of connecting the ends of a band-like clip which is so constructed that all portions of the joint lie entirely within the thickness of the metal of which the clip is made so that the clip is of uniform thickness throughout.

Another object of this invention is to provide a spring clip which is so constructed that variations in the size of the spring leaves which the clip embraces are compensated for and a snug fit between the clip and spring is assured.

Another object of this invention is to provide a clip having a fastening or connection in two sections acting at right angles to each other so that one section serves to hold the other against separation as the leaves of the spring tend to spread and snap apart.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a perspective view of a spring clip constructed in accordance with this invention and illustrating the same prior to its application to the spring; and Figure 2 is a perspective view showing the clip in place.

Referring now more particularly to the accompanying drawing in which like numerals indicate like parts, the numeral 5 designates the body of the clip which, as shown, consists of a band of metal bent transversely to provide a bottom wall 6, a side wall 7, a top wall 8, and a second side wall 9. Prior to application of the clip to the spring, the ends of the band are spread apart as shown in Figure 1, but in applying the same to the spring, the ends are joined so that a substantially endless band is formed.

The connection between the ends of the band is in two right angularly disposed parts, each in the form of a dove-tail joint, one indicated generally by the numeral 10 overlying the top of the spring, and the other indicated generally by the numeral 11, being disposed at the side of the spring.

The top dovetail joint 10 comprises a substantially T shaped central projection 12 formed as part of the side wall 9 with its headed portion 13 bent over as shown for engagement into a recess 14 in the top wall 8. The side joint 11 comprises two L shaped extensions 15 adapted to enter correspondingly shaped recesses 16 in the side wall 9.

By this construction, the ends of the clip are interlocked both at the top and one side so that the joint is secure against both lateral stresses incidental to a tendency for the leaves of the spring to fan, as when the car sways sidewise, and vertical stresses incidental to snapping of the spring, as when the wheel drops into a hole in the road.

If the stress is applied on the side wall, as in the tendency for the leaves of the spring to fan, the top dovetail 10 holds the side wall from being pushed outwardly enough to disengage the side dovetail joints 11, and if the stress is applied in a vertical direction, as in a tendency for the leaves to snap apart, the dovetails 11 on the side wall securely hold the clip together and prevent displacement of the interengaging portions of the dovetail 10.

As is well known, the width and thickness of the spring leaves varies, and as there is no compensation in the conection between the ends of the clip, some means must be provided to compensate for this variation in the width and thickness of the spring leaves.

In the present invention, this is effectually accomplished by curving the side walls 7 and 9 and the top wall 8 inwardly, as best shown in Figure 1. With this curved formation of the walls, it follows that as the clip is applied, its walls are flattened to the extent necessary for proper engagement of the dovetails. Hence, the spring will be firmly gripped on all sides and any variation in the size of the spring leaves will be fully compensated for.

In applying the clip to a spring, the clip in its open form as shown in Figure 1, is slipped over the smallest part of the spring and slid lengthwise of the spring to embrace the leaves which it is intended to clip together. The ends of the clip are then drawn together by hand clamps, or some suitable tool. It has been found desirable to first press in the side wall 9 until its tongue 12 engages snugly over the top of the spring, and then with the side wall held in this position by some clamping means slotted to clear the downward swing of the extensions 15 carried by the top wall, the top wall is swung down which presses together the top dovetail joint; and finally the side dovetail joints 11 are completed by pressing the L shaped extensions 15 into the correspondingly shaped recesses 16.

It is to be noted that the side edges of the tongue 12 and the sides of the recess 14 engageable therewith are parallel. This materially facilitates application of the clip to a spring as it permits the interengaging portions to be engaged without difficulty. Also, by disposing the abutting shoulders provided by the extensions 15 and their recesses 16 and by the head 13 of the tongue and the recess 14 at a substantial distance from the corner of the spring about which the joint is bent, only a slight movement is necessary to effect engagement and disengagement of the shoulders.

The clip should be installed so that the joint is at the master leaf corner and not at the short leaf where the bursting stresses are greatest.

To prevent endwise shifting of the clip on the spring, a projection 17 is struck up from the bottom wall 6 to enter a punched hole in the adjacent leaf.

From the foregoing description taken in connection with the accompanying drawing, it will be readily apparent to those skilled in the art to which this invention appertains, that this invention provides a spring clip which is easily applied to a vehicle spring either after the spring is in place on the vehicle or before, and which is so constructed that all portions thereof are uniformly thin so as not to produce objectionable bulges in the spring cover, and further that by reason of the curvature of the side and top walls, variations in the cross sectional size of the spring are readily compensated for and a snug fit between the clip and the spring is assured.

What I claim as my invention is:

1. A spring clip for vehicle leaf springs comprising a metal band of uniform thickness throughout and of sufficient length to embrace the spring at the point of intended application of the clip to the spring, and interlocking means on the ends of said band to join the same, said means having portions acting at right angles to each other to resist stresses imposed in either of two directions, and said means having all portions thereof lying within the thickness of the metal band so that no portion of the clip has a thickness in excess of the uniform thickness of the band.

2. A clip for vehicle leaf springs comprising a metal band bent to embrace the spring, and interlocking means on the ends of said band forming a joint to secure the ends of the band together, said joint having portions disposed on two adjacent sides of the spring so as to resist stresses imposed thereon in either of two directions.

3. A clip for vehicle leaf springs comprising a metal band bent to embrace the spring, and means on the ends of the band forming an interlocking joint having portions lying on two adjacent sides of the spring and each portion of said joint being adapted for edgewise engagement and disengagement and securely preventing relative endwise movement between the ends of the band so that stress in either of two directions imposed on the joint by a tendency of the leaves of the spring to spread sidewise or to snap apart is securely resisted.

4. A spring clip for vehicle leaf springs comprising a metal band encircling the spring with its ends in juxtaposition, means on said ends of the band providing an interengaging dovetail connection between the ends of the band, said connection being composed of sections one overlying a side of the spring and the other overlying the top of the spring so that the holding action of one section acts to prevent displacement of the parts forming the other section.

5. A clip for vehicle leaf springs comprising a metal band embracing the spring with its ends in juxtaposition, and a composite dovetail connection between the ends of the band comprising a tongue engaging in a recess at the side of the spring, and a second tongue engaging in a recess around the corner from said side of the spring, engagement and disengagement of the tongues with their respective recesses being accomplished by edgewise relative motion between the tongues and recessed portions, and the joints formed thereby being secure against endwise stresses applied to the engaging portions so that a tendency for a stress in one direction to displace one tongue from its recess is resisted by the holding action of the other joint, and vice versa.

6. A spring clip for vehicle leaf springs comprising a metal band bent to embrace the spring with its ends in juxtaposition, means integral with the band to join the ends thereof, and certain walls of the band being curved inwardly so as to compensate for variations in size of the vehicle leaf springs and assure snug engagement between the clip and the spring.

7. A spring clip of the character described comprising a metal band bent to provide four substantially rectangularly disposed walls to embrace the leaves of a vehicle spring, means on the ends of the band to hold the same securely joined, and certain walls of the clip being curved inwardly to compensate for variations in size of the spring and to assure snug engagement between the clip and the spring.

8. A spring clip of the character described comprising a one piece metal band bent to embrace the spring and having a bottom wall, a top wall and side walls, the ends of the band being located at one corner formed by a side wall and the top wall, means on said ends of the band providing an interlocking joint securing the ends of the band together, and said side walls and top wall being curved inwardly to compensate for variations in size of the spring and to assure snug engagement between the clip and the spring.

9. A spring clip of the character described, comprising a one-piece metal band bent to embrace four sides of a leaf spring whereby said band has a top wall, a bottom wall and side walls, the ends of the band being located at the juncture of one side wall with one of the adjacent walls, means on said ends of the band providing an interlocking joint disposed partly on said side wall and partly on said adjacent wall, said joint including interengaging shoulders on the ends of the band lying entirely within the thickness of the band and adapted to engage each other to resist vertical forces incidental to a tendency of the spring leaves to snap apart and horizontal forces incidental to a tendency of the leaves of the spring to spread sidewise, said shoulders being spaced from the corner about which the joint extends and being joined by parallel portions whereby the said shoulders are freely moved into and out of engagement.

10. A clip for vehicle leaf springs, comprising a metal band of sufficient length to embrace the spring at the point of intended application of the clip to the spring, and a joint on the ends of said band and extending around one corner of the spring and having interlocking portions overlying the adjacent walls of the spring joined by said corner so that one of said interlocking portions resists vertical stresses and the other interlocking portion resists horizontal stresses, and said interlocking portions being joined by parts having parallel side edges so as to enable engagement and disengagement of the interlocking portions without interference.

11. A spring clip for vehicle leaf springs, comprising a metal band of uniform thickness throughout and of sufficient length to embrace the spring at the point of intended application of the clip to the spring, an interlocking joint joining the ends of the spring adjacent one corner so that said interlocking joint has portions overlying the adjacent sides of the spring at said corner, said interlocking portions comprising substantially T shaped tongues received in correspondingly shaped recesses, and the side edges of said T shaped tongues being parallel to facilitate engagement and disengagement of the heads of the T shaped tongues in their respective recesses.

EDWARD N. JACOBI.